(12) United States Patent
Growcock

(10) Patent No.: US 7,717,177 B2
(45) Date of Patent: May 18, 2010

(54) ENERGIZED FLUID FOR GENERATING SELF-CLEANING FILTER CAKE

(75) Inventor: Frederick B. Growcock, Houston, TX (US)

(73) Assignee: M-I LLC, Houston, TX (US)

( * ) Notice: Subject to any disclaimer, the term of this patent is extended or adjusted under 35 U.S.C. 154(b) by 202 days.

(21) Appl. No.: 11/737,037

(22) Filed: Apr. 18, 2007

(65) Prior Publication Data

US 2007/0272409 A1     Nov. 29, 2007

Related U.S. Application Data

(60) Provisional application No. 60/802,725, filed on May 23, 2006.

(51) Int. Cl.
*E21B 43/04* (2006.01)
*E21B 21/00* (2006.01)

(52) U.S. Cl. .................... 166/278; 166/305.1; 166/310; 166/311

(58) Field of Classification Search ........................ None
See application file for complete search history.

(56) References Cited

U.S. PATENT DOCUMENTS

| | | | |
|---|---|---|---|
| 4,093,028 A | 6/1978 | Brandon | |
| 4,964,466 A | 10/1990 | Williams et al. | |
| 5,201,370 A | 4/1993 | Tjon-Joe-Pin | |
| 5,224,544 A | 7/1993 | Tjon-Joe-Pin et al. | |
| 5,238,065 A | 8/1993 | Mondshine et al. | |
| 5,247,995 A | 9/1993 | Tjon-Joe-Pin et al. | |
| 5,251,697 A | 10/1993 | Shuler | |
| 5,682,951 A * | 11/1997 | Sydansk | ...................... 166/292 |
| 5,990,052 A | 11/1999 | Harris | |
| 6,806,233 B2 | 10/2004 | Patel | |
| 6,822,039 B1 | 11/2004 | Monfreux-Gaillard et al. | |
| 6,828,279 B2 | 12/2004 | Patel et al. | |
| 6,861,394 B2 | 3/2005 | Ballard et al. | |
| 6,886,635 B2 | 5/2005 | Hossaini et al. | |

FOREIGN PATENT DOCUMENTS

WO      97/21021 A1     6/1997

OTHER PUBLICATIONS

PCT International Preliminary Report on Patentability and Written Opinion of the Searching Authority, International Application No. PCT/US2007/069346 Dated Dec. 11, 2008; 5 pages.
Supplementary European Search Report for related Application No. 07 797 615.7; dated Mar. 1, 2010 (8 pages).

* cited by examiner

*Primary Examiner*—Jennifer H Gay
*Assistant Examiner*—Angela M DiTrani
(74) *Attorney, Agent, or Firm*—Osha • Liang LLP

(57) ABSTRACT

A process for generating and subsequently breaking a filter cake, including dissolving a non-reactive gas in a wellbore fluid to form an energized fluid; pumping the energized fluid into a formation at a downhole pressure, wherein the pumping is at overbalanced conditions; producing a filter cake; and decreasing the down hole pressure to below a cut point of the dissolved gas in the energized fluid to form a vapor phase, wherein the vapor phase compromises the integrity of the filter cake is disclosed.

22 Claims, No Drawings

ENERGIZED FLUID FOR GENERATING SELF-CLEANING FILTER CAKE

CROSS-REFERENCE TO RELATED APPLICATION

This application claims benefit priority to U.S. Provisional Patent Application No. 60/802,725, filed May 23, 2006, the disclosure of which is incorporated herein by reference.

BACKGROUND OF INVENTION

1. Field of the Invention

Embodiments disclosed herein generally relate to compositions and methods for removing a filter cake from a wellbore. More specifically, embodiments disclosed herein relate to the use of an energized fluid breaking a filter cake or for generating a self-cleaning filter cake.

2. Background

When drilling or completing wells in earth formations, various fluids typically are used in the well for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining wellbore stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used to place a packer, abandoning the well or preparing the well for abandonment, and otherwise treating the well or the formation.

During drilling, the pressure balance between the circulating drilling fluids and that of the formation being drilled may be maintained in an underbalanced or an overbalanced mode. Underbalanced drilling is a method of drilling a desired subterranean formation where the hydrostatic pressure exerted by a column of drilling fluid in the drill string is less than the natural pressure (pore pressure) inherent in the subterranean formation being drilled. Underbalanced drilling may prevent damage to the desired subterranean formation and in particular low pressure formations. Typically, the pressure differential is set to provide a margin above the pressure at which wellbore collapse might occur. The introduction of sufficient air, nitrogen or other gases to the drilling fluids can reduce the density of the commingled fluids and effectively decrease hydrostatic pressure. Other low density fluids such as emulsions, foams and mists may be used as a drilling fluid to achieve an underbalanced condition.

In overbalanced drilling, fluid in an annulus of a well is used to exert a pressure that is greater than the formation pressure. The mud weight, or density, may be calculated to give the appropriate pressure gradient across the exposed formation to provide the optimum fluid migration rate into the least stable horizon of the exposed formation. Thus, the pressure that is exerted by the annular fluid keeps formation fluids from exiting the well and may provide support for the wellbore. A drawback to this technique is that particulates added to increase the weight of the fluid (and, thus, increase its downhole pressure), as well as other particulates, emulsified fluids and surfactants, may be pushed in and damage the formation. The well may also need to be tested after overbalanced drilling to check for formation damage.

In addition to the appropriate use of underbalanced or overbalanced drilling, another way to protect the formation is by forming a filter cake on the surface of the wellbore. A filter cake is a tough, dense, practically insoluble residue that reduces the permeability of the formation and which is formed when particles or emulsified fluids suspended in a drilling fluid coat or plug the pores in the subterranean formation while drilling overbalanced. Filter cakes may be formed a number of ways known in the art, including the use of both clay and non-clay based drilling fluids.

Sealing off producing formations using a filter cake may also be desired in order to prevent fluid loss and possible damage to the formation. Filter cakes can prevent loss of drilling fluids to the formation by substantially preventing fluids from passing between the wellbore and the formation. Formation of a filter cake may also be desired prior to completion or workover of a well.

It is often desirable or necessary to remove the filter cake prior to cementing or bringing a well on production. The presence of the filter cake can hinder the passage of fluid from the formation to the wellbore and thereby retard production rates. Where a fluid or gas is being pumped into the formation for enhancing oil recovery, a filter cake can hinder the passage of fluid from the wellbore to the formation, thus hindering recovery efforts. Therefore, removal of filter cake is necessary to increase the flow of fluids from or to the formation, as required. Since filter cake is dense and practically insoluble in aqueous fluids, and generally adheres strongly to the formation, it cannot be merely flushed out of the formation. Removal of filter cake requires some additional treatment.

Various methods have been used to clean up filter cakes, including techniques invoked during flowback of producing fluids. For example, see Zain, Z. et al, SPE Drilling & Completion, December 2001, and special materials in fluid loss pills, e.g. SEAL-N-PEEL®.

One method to break or clean up the filter cake involves spotting an oxidizing agent or enzyme to destroy organic constituents in the cake and an acid to react with carbonate bridging agent (Luyster, M. R., SPE 58749). U.S. Pat. No. 6,861,394 discloses a wellbore fluid including a peroxide-degradable polymer and an encapsulated peroxide source. The release of peroxide from the peroxide source is controlled by means of pH such that the peroxide source can be activated, and peroxide released, by a change in pH. In a wellbore, this pH change can be effected by using produced fluids to lower the pH of a more alkaline wellbore fluid. The peroxide, when released, degrades the polymer and lessens the integrity of the filter cake.

U.S. Pat. No. 5,251,697 discloses the addition of calcium carbonate to water being injected into a well. The calcium carbonate particles either clog the pores in the subterranean rock formations or collect and build a filter cake. When the filter cake is to be removed, the '697 patent directs the operator to circulate an acid wash, preferably hydrochloric acid, into the well. The acid wash will dissolve the calcium carbonate and thereby destroy the filter cake. At this point the well can be brought on production or additional work may be performed on the well.

U.S. Pat. No. 5,238,065 discloses the use of a peroxide-degradable polymer and an encapsulated peroxide source in the drilling fluid, which forms a filter cake containing both of these elements. The peroxide degradable polymer may be a polysaccharide, and the peroxide source may be an inorganic peroxide, including zinc and alkaline earth metal peroxides, such as magnesium peroxide. The encapsulating material for the peroxide may be a polymer, including enteric polymers. The release of peroxide, from peroxide sources generally, can be controlled by reduction of pH. In this case, when it is time to remove the filter cake, the pH of the fluid simply needs to be reduced or the low-pH formation fluid needs to be brought in contact with the filter cake to activate the peroxide, The latter degrades the peroxide-degradable polymer and causes the filter cake to lose its integrity and fall apart. The encapsulated peroxide is a member of the class of materials generally referred to as internal breakers. The use of an internal breaker is beneficial because it requires less peroxide, less loss of wash fluid to the formation, and gives more complete removal of the filter cake.

U.S. Pat. No. 6,886,635 discloses a composition for a filter cake removal fluid having a persulfate salt. The persulfate salt breaks down the filter cake in a controlled manner at downhole temperatures ranging from about 65° F. to about 165° F. without the addition of activators. Mud additives that generate acid in situ upon being exposed to a triggering event, such as a critical temperature or salt concentration, may also be used (Nasr-el-din, H. R. et al, SPE 96965).

Noncorrosive chelating agents, such as those employed in the Schlumberger MUDSOLV® process, can be even more effective than acid removal of the bridging agent. Some of the chelating agents can also be encapsulated and added to the mud so that they become incorporated in the filter cake. Before the well comes on production, the reagents are released by introducing a triggering agent at the face of the cake, such as a change in pH. Other systems treat a filter cake containing carbonate particles with glycol, such as in the SEAL-N-PEEL® system available from MI-SWACO®, where the glycol reduces the adhesive forces of the carbonate, allowing the filter cake to break.

Enzyme systems are known to degrade the types of polysaccharides used in fracturing, blocking gels and other oil industry applications. Enzyme breaker systems have been designed to break gelled fracturing and blocking fluids used in the industry. See, for example, U.S. Pat. Nos. 5,201,370 and 5,224,544. Enzymes, for example the cellulases, hemicellulases, amylases, pectinases, and their mixtures, are familiar to those in the well service industry when used in fracturing gel breaker systems. Some of these enzymes break the bonds that connect the monosaccharides into a polysaccharide backbone, for instance, the (1,4)-α-D-galactosiduronic linkages in pectin. These conventional enzymes are nonspecific mixtures that cause random breaks. Therefore, using these conventional enzymes to break gelled fracturing fluids results in only a partial degradation of the polysaccharide polymer. Instead of fragmenting almost completely into much smaller fragments, these enzymes break the polysaccharide backbone into a mixture of fragments consisting of monosaccharides, disaccharides and polysaccharides. Larger crosslinked fragments like disaccharides and polysaccharides can remain behind and damage the production zone. Since the breaks are nonspecific, conventional enzymes also can degrade other components used in the system.

U.S. Pat. No. 5,247,995 discloses a method of degrading damaging material within a subterranean formation of a well bore using an enzyme treatment. Filter cakes and very viscous fluids are such damaging materials. The enzyme treatment degrades polysaccharide-containing filter cakes and damaging fluids, thereby reducing their viscosity. The degraded filter cake and damaging fluid can then be removed from the formation back to the well surface with less back pressure. The particular enzymes utilized are specific to a particular type of polysaccharide and are active at low to moderate temperatures. The enzymes attack only specific linkages in filter cakes and damaging fluids and are active in the pH range of about 2.0 to 10.0.

Drilling fluids may also employ oil-based surfactants or hydrophobic insoluble materials in the mud that become incorporated in the filter cake, such as the FLOTHRU™ drill-in fluid available from MI-SWACO®. During production, hydrocarbons interact with the surfactants or hydrophobic filter cake components to create minute channels through the filter cake. Invertible emulsions, which may aid in filter cake removal, are also described in U.S. Pat. Nos. 6,828,279, 6,822,039, and 6,806,233, for example.

The above described systems have drawbacks, including premature activation of the degradation mechanism. Premature activation can result in premature weakening of the filter cake, as well as reduction in the ability of the filter cake to control fluid loss. Additionally, the acid or other solutions used to dissolve filter cakes can have a harmful effect on the formation, if they are not prevented from invading it.

As another drawback, common oxidants, for example persulfates, are often ineffective at low temperatures ranging from ambient temperature to 130° F. In this temperature range, the oxidants are typically stable and do not readily undergo homolytic cleavage to initiate the degradation of the filter cake. Cleavage is typically achieved at lower temperatures only by using high concentrations of oxidizers. However, oxidizers frequently have very limited solubility, and usually it is not possible to maintain high concentrations of oxidizers in solution.

Reactions with common oxidants are also difficult to control. Common oxidants break polysaccharides into nonspecific units, creating a filter cake consisting of a mixture of monosaccharide, disaccharide, and polysaccharide fragments as well as other miscellaneous fragments. Oxidants can also react with iron found in the formation, producing iron oxides which precipitate and damage the formation, thereby decreasing permeability. Oxidants can also react nonspecifically with other materials used in the oil industry, for example, tubing, linings, and resin-coated proppants.

Further, oxidants can break down any subsequent gels used in the formation. If the oxidants are not completely removed or inactivated, they can prematurely break the new gel. Therefore, oxidants must be completely removed or inactivated before subsequent introduction of another gel into the subterranean formation.

Accordingly, there exists a need for improved processes for removing a filter cake from a wellbore.

SUMMARY OF INVENTION

In one aspect, disclosed embodiments relate to a process for forming and subsequently breaking a filter cake, comprising: dissolving a non-reactive gas in a wellbore fluid to form an energized fluid; pumping the energized fluid into a formation at a downhole pressure, wherein the pumping is at overbalanced conditions, producing a filter cake; and decreasing the down hole pressure to below a cut point of the dissolved gas in the energized fluid to form a vapor phase, wherein the vapor phase compromises the integrity of the filter cake.

Other aspects and advantages of the invention will be apparent from the following description and the appended claims.

DETAILED DESCRIPTION

In one aspect, disclosed embodiments relate to a process for forming pinholes or channels in a filter cake using the effervescence of a dissolved gas dissolved in the filter cake and downhole formations. The pinholes or channels created may allow a path through which the fluid in the formation may migrate when produced. In other embodiments, the effervescence of a dissolved gas may compromise the integrity of the filter cake, facilitating breakthrough of the produced fluid.

A non-reactive gas may be dissolved in a drilling fluid up to the solubility limit for the gas in the liquid. In some embodiments, the non-reactive gas may saturate the drilling fluid at the pore pressure of the permeable zone of interest (i.e., the zone to be produced). Thus, none of the gas is present as a separate phase and does not reduce the fluid density. During drilling in a typical overbalanced condition, the solids in the circulated drilling fluid may form a filter cake on the wellbore. Gases dissolved in the drilling fluid may penetrate pores in the formation during formation of the filter cake, and dissolved gas may also remain in any residual liquid within the filter cake.

When the zone is to be cemented or put on production, the solubility of the gas in the drilling fluid may be lowered below the cut point of the gas (solubility limit), triggering the gas to come out of solution, forming gas bubbles or gas pockets within the formation. Gas bubbles may also be generated in any filter cake deposited on the wellbore during the drilling operation. The formation of gas bubbles may compromise the integrity of the filter cake, facilitating breakthrough of the produced fluid. The solubility of the gas in the drilling fluid may be decreased by lowering the density of the drilling fluid circulating through the drill string, for example.

Drilling Fluids

Drilling fluids or muds typically include a base fluid (water, diesel, mineral oil, or a synthetic compound, for example), weighting agents (for example, barium sulfate or barite may be used), bentonite clay, and various additives that serve specific functions, such as polymers, corrosion inhibitors, emulsifiers, lubricants, gels or gelling agents, and other various components. Those having ordinary skill in the art will recognize that a number of different drilling muds exist and that limitation of the present invention is not intended by reference to particular types of fluids.

Non-Reactive Gas

A non-reactive gas may be dissolved in a drilling fluid, such as those described above, to form an energized fluid. Non-reactive gases that may be employed in embodiments disclosed herein include nitrogen, carbon dioxide, sulfur hexafluoride, helium, argon, neon, krypton, xenon, and radon. Other gases that may be employed in embodiments disclosed herein include ammonia, carbon monoxide, air, oxygen, halogenated hydrocarbons, hydrogen, $C_1$ to $C_6$ hydrocarbons, such as methane, ethane, propanes, butanes, pentanes, and hexanes, and nitrogen oxides, such as NO or $NO_2$. In other embodiments, combinations of two or more of the above gases may be used.

Embodiments disclosed herein may be applied with any type of fluid that is chemically compatible with a non-reactive gas or a mixture of non-reactive gases. For example, nitrogen may be used with any type of drilling fluid, including water-based or oil-based, weighted or unweighted, and may be used at any temperature or pressure.

The viability of a gas employed may depend upon the drilling fluid, drilling environment, and other factors. For example, for drilling fluids that include an oxygen scavenger, air may be used without fear of corrosive or reactive effects. As another example, carbon dioxide may form acidic species in water, and if used with a water-based drilling fluid under certain conditions, may result in undesired reactive or corrosive effects.

The viability for a gas employed in embodiments disclosed herein also depends upon the proximity of the downhole conditions to the boiling point or the critical temperature and/or critical pressure of the gas. Table 1 presents the critical temperature and critical pressure for a few of the compounds that may be useful in embodiments for the energized fluids disclosed herein. Gases that may exhibit liquid-like behavior at downhole conditions may not perform as well as gases that are well removed from their critical temperature and/or pressure.

TABLE 1

| Compound | Critical Temperature (° C.) | Critical Pressure (bar, absolute) |
|---|---|---|
| Helium | −267.95 | 2.29 |
| Oxygen ($O_2$) | −118.6 | 50.4 |
| Nitrogen ($N_2$) | −146.9 | 34.0 |
| Hydrogen (H2) | −239.96 | 13.2 |
| Carbon Dioxide ($CO_2$) | 31.1 | 73.8 |
| Ammonia ($NH_3$) | 132.4 | 112.8 |

For example, at 25° C. and 200 bar, carbon dioxide is a liquid. Upon decreasing the downhole pressure to 150 bar, carbon dioxide remains a liquid. Thus, carbon dioxide may not be suitable for use as an energizing material under these conditions. In contrast, nitrogen at 25° C. is well above its critical temperature and is a gas at 200 bar. Indeed, it cannot be liquefied at this temperature regardless how high the pressure might be raised. Thus, under these conditions, nitrogen which is not dissolved in the surrounding medium must exist as a gas. Upon reducing the surrounding pressure below the saturation level, nitrogen will come out of solution in the form of a gas. Therefore, nitrogen is a suitable energizing material. Similarly, carbon dioxide may be useful in formations having a higher downhole temperature, i.e., at a temperature above the boiling point for carbon dioxide at a given pressure, or at a temperature well above the critical temperature for carbon dioxide for downhole pressures exceeding the critical pressure of carbon dioxide.

In some embodiments, a non-reactive gas may be dissolved in a drilling fluid. In other embodiments, a non-reactive gas may be dissolved up to the saturation limit of the gas in the drilling fluid. For example, the drilling fluid mixture may be a liquid or a solid-liquid suspension, without a vapor phase being present. In other embodiments, the gas may be dissolved to achieve saturation or near saturation at the downhole pressure of interest, which may depend upon the depth of the formation and the density or weight of the drilling fluid employed. In other embodiments, the wellbore fluid may be substantially saturated with a dissolved gas; as used herein, substantially saturated means the gas is dissolved to at least 75 percent of saturation at the temperature and pressure of the pore fluid in the formation of interest.

In some embodiments, the drilling fluid may contain no undissolved gas at the downhole pressure, where the drilling fluid may behave as a gas-free fluid at the downhole pressure. In other embodiments, the drilling fluid may contain some undissolved gas.

In some embodiments, the gas may be introduced or dissolved to a desired concentration via injection at the wellhead using a low-pressure pump. In other embodiments, gas may be injected into the drilling fluid near the bit or near the formation of interest via a conduit extending through the drill string.

In other embodiments, the gas may be generated in situ at or near the zone of interest. For example, gas may be generated by in situ nitrogen generation. See Antheunis, D. et al, SPE 9653. Reagents that form nitrogen or other gases as reaction products may be injected in the well along with the wellbore fluid. The gases generated may then dissolve in the fluid to form an energized fluid.

Breaking the Filter Cake

Upon formation of a filter cake with an energized fluid as described above, it may be possible to break the filter cake without chemical or additive treatment. Forming pinholes, channels, or otherwise compromising the integrity of the filter cake may, in some embodiments, be facilitated by forming a vapor phase within, behind, or around the filter cake from the dissolved gas. Formation of the desired vapor phase may be obtained by decreasing the solubility of the gas dissolved in the drilling fluid to below the cut point of the gas (below the solubility limit).

In some embodiments, the solubility of a gas in the drilling fluid may be decreased below the cut point (solubility limit) of the gas by decreasing the density (weight) of the drilling fluid. In other embodiments, the solubility of a gas in the drilling fluid may be decreased below the cut point of the gas by decreasing the drilling fluid circulation pump pressure.

In some embodiments, the solubility of a gas in the drilling fluid may be decreased below the cut point of the gas rapidly. In other embodiments, the solubility of a gas in the drilling fluid may be decreased below the cut point of the gas gradually, for example so as to minimize hydraulic shock of the wellbore.

In some embodiments, the resulting vapor phase formed may range from 0.0001 to 10 liters of vapor per liter of drilling fluid at downhole conditions. In other embodiments, the resulting vapor phase may range from 0.001 to 1 liters of vapor per liter of drilling fluid; from 0.002 to 0.5 liters of vapor per liter of drilling fluid in other embodiments; and 0.005 liters of vapor per liter of drilling fluid or greater in yet other embodiments.

The solubility of a gas in a liquid may be estimated using Henry's Law, for example. Henry's Law states that the solubility of a gas in a liquid is proportional to the partial pressure of the gas above the liquid according to the relationship $P=H_v*M$, where P is the partial pressure of the gas, $H_v$ is a proportionality constant specific to the gas and liquid, and M is the concentration of the gas in the liquid phase. Thus, as pressure is increased, solubility increases proportionally. Henry's Law constants for a few example gases in water at 25° C. are presented in Table 2, were P is expressed in units of bar or atm and M is expressed as mole/L.

TABLE 2

| Gas | $H_v$ (atm/(mole/L)) | $H_v$ (bar/(mole/L)) |
| --- | --- | --- |
| Helium | 2865 | 2903 |
| Oxygen ($O_2$) | 765.7 | 775.8 |
| Nitrogen ($N_2$) | 1600 | 1621 |
| Hydrogen ($H_2$) | 1228 | 1244 |
| Carbon Dioxide ($CO_2$) | 29.76 | 30.2 |
| Ammonia ($NH_3$) | 56.9 | 57.7 |

As an example of decreasing the solubility of a gas to compromise the integrity of a filter cake, a water-based drilling fluid having a density of 1200 kg/m³ being circulated through a wellbore at a depth of 1000 meters, a temperature of 25° C. (298 K) and a downhole pressure of 119 bar (117 atm), will have a nitrogen solubility of approximately 0.073 mole/L. Use of a drilling fluid saturated with nitrogen at 25° C. and a downhole pressure of 119 bar will generate a filter cake saturated with nitrogen, and both the wellbore fluid and filtrate behind the filter cake will be saturated with nitrogen. The solubility of nitrogen in and around the filter cake may then be decreased so as to form a vapor phase within the residual liquid.

As one example of decreasing nitrogen solubility, the density of the drilling fluid circulating through the wellbore may be decreased to 850 kg/m³, resulting in a decrease in downhole pressure to approximately 84 bar (83 atm), based upon the change in weight of the fluid in the drillstring. This decrease in pressure in the zone of interest may decrease the nitrogen solubility in the residual fluid to approximately 0.052 mole/L. The resulting decrease in solubility will release the excess nitrogen (approximately 0.02 mole/L), forming bubbles in the formation and within the filter cake, thereby compromising the integrity of the filter cake. The insoluble nitrogen (0.02 mole/L) may result in formation of approximately 6 mL of bubbles per liter of drilling fluid, using the Ideal Gas Law, PV=nRT, at a temperature of 298 K.

Henry's Law, as used in the example above, presents an estimate of gas solubility. Those skilled in the art will recognize that the use of Henry's Law approximates solubility of gases at elevated temperatures and pressures; similarly, the Ideal Gas Law approximates the volume of gas at elevated temperatures and pressures. The solubility of a gas in a liquid, and the volume of a gas, depend on several factors in addition to temperature and pressure, such as the base fluid employed, and the type and concentration of other components in the drilling fluid. For example, a saline-based drilling fluid may have a lower nitrogen solubility than a water-based drilling fluid. A diesel, oil, or other non-aqueous drilling fluid may also have different nitrogen solubility. Other components in the drilling fluid, such as barite, bentonite, and graphite, may also affect the solubility of nitrogen in the drilling fluid in the above example. Additionally, it is known that solubility is a function of temperature ($H_v=f(T)$, for example) and that the above results may vary depending upon the temperature of the drilling fluid in the wellbore.

As another example, drilling is being performed at a depth of 2700 meters and a downhole temperature of 25° C. using a water-based drilling fluid. Nitrogen is pumped into a well through annular tubing, where it mixes and dissolves in the drilling fluid prior to contacting the formation. The drilling fluid is running overbalanced, with a drilling fluid density of approximately 1300 kg/m³, and the pressure at the bit is approximately 345 bar (341 atm, or 5010 psia). Nitrogen solubility at these conditions, again using Henry's Law, is approximately 0.213 mole/L of drilling fluid. The pressure at the bit may be decreased to approximately 318.9 bar (4625 psia), resulting in a decrease in nitrogen solubility to approximately 0.197 mole/L of drilling fluid. Based upon the difference in nitrogen solubility at the above conditions, approximately 1.2 mL of nitrogen gas will be released per liter of the energized drilling fluid. The released vapors may form pinholes, fissures, or otherwise compromise the integrity of the filter cake.

As another example, drilling is again being performed at a depth of 2700 meters and a downhole temperature of 25° C. using a water-based drilling fluid. Nitrogen is pumped in through annular tubing, where it mixes and dissolves in the drilling fluid prior to contacting the formation. The drilling fluid is running overbalanced, with a drilling fluid density of approximately 1300 kg/m³, and the pressure at the bit is approximately 345 bar (5010 psia). Nitrogen solubility at these conditions, again approximated with Henry's Law, is 0.213 mole/L of drilling fluid. The nitrogen rate may be regulated such that the drilling fluid is 90 percent saturated with nitrogen (~0.1917 mole/L of drilling fluid). For this case, decreasing the pressure at the bit by decreasing the circulation pressure or the density of the drilling fluid to a point such that the pressure at the bit is approximately 306.8 bar (4450 psia) would result in increasing the nitrogen to the point of saturation in the fluid. Further decrease of the pressure at the bit would result in over-saturation, and a vapor phase would form. For example, decreasing the weight of the drilling mud to 1000 kg/m$^3$ would result in a nitrogen saturation of 0.164 mole/L of drilling fluid, and generation of approximately 2.6 mL of gas per liter of drilling fluid in, behind, and around the filter cake. Decreasing the fluid density to 1100 kg/m$^3$ would result in approximately 0.74 mL nitrogen vapor per liter of drilling fluid in, behind, and around the filter cake.

Throughout the change in downhole pressure, however this might be effected, nitrogen may be dissolved in the circulating drilling fluid to a point of saturation or over-saturation. In this manner, nitrogen that may be released from the energized fluid in, behind, and generally around the filter cake will push its way out of the filter cake, thereby altering its structure and effectively destroying its integrity. Additionally, nitrogen bubbles formed behind the filter cake may enhance the breaking of the cake, and nitrogen bubbles formed in the circulating fluid may act as a scrubbing agent, aiding in the breaking of the cake from the wall of the formation.

The use of nitrogen and water-based drilling fluids in the above are for illustrative purposes only, and are not intended to limit the scope of the invention. Other gases and drilling fluids may be used, as detailed above.

Similarly, a non-reactive gas may be dissolved in a workover fluid or in a finishing fluid. For example, prior to workover of a well, it may be necessary to temporarily seal the formation with a filter cake. The filter cake formed during workover or finishing may be formed with an energized fluid, similar to the energized drilling fluid as described above. Upon completion of the workover, for example, the filter cake may be broken by altering the solubility of the gas as described above.

Combination With Current Breaking Practices

The wellbore breaking technique disclosed herein may be used to enhance conventional filter breaking techniques. In some embodiments, use of an energized fluid may be combined with acid treatment of a filter cake. In other embodiments, use of an energized fluid may be combined with enzyme treatment. In yet other embodiments, use of an energized fluid may be combined with use of chelating agents to break a filter cake. In yet other embodiments, energized fluids may be combined with glycol treatment of a filter cake containing carbonates. In yet other embodiments, energized fluids may be combined with invertible emulsions.

For example, an energized fluid may be used to compromise the integrity of a filter cake as described above, forming pinholes and other flow channels in and through the filter cake. Subsequently, an acid treatment of the filter cake may take advantage of the flow channels, allowing the acid treatment to attack not only the surface of the filter cake, but interior portions of the filter cake as well. In this manner, acid treatment of the filter cake may be enhanced, potentially requiring less time and less acid to break the filter cake.

Another example is that of a drilling fluid which is actually energized at downhole temperature and pressure, i.e., not all the gas is dissolved. If the gas is dispersed uniformly, i.e., in the form of tiny bubbles, those bubbles will be incorporated into the filter cake (the bubbles will act like particulates). When the pressure or mud weight is reduced, not only will gas come out of solution, but also the existing bubbles will expand as per the Ideal Gas Law and break up the filter cake.

Advantageously, embodiments disclosed herein provide a process for injecting a drilling fluid saturated with non-reactive gas into a well. In some embodiments, a sufficient quantity of a non-reactive gas may be injected into a drilling fluid such that it saturates the base fluid, i.e. it is at the solubility limit for the gas in the liquid, at the pressure and temperature of the wellbore in the permeable zone of interest. Thus, during drilling in a typical overbalanced condition, a filter cake may be formed, wherein the fluid behind and within the filter cake may contain dissolved gas. When the zone is to be cemented or put on production, the solubility of the gas in the fluid may be lowered below the cut point of the gas, and it begins to come out of solution. In the process of doing so, gas bubbles are formed in any filter cake deposited on the wellbore during the drilling operation, thus compromising the integrity of the cake and facilitating breakthrough of the produced fluid.

This technique may be applied with any type of gas that is chemically compatible with the drilling fluid. Thus, any type of drilling fluid may be used, including water-based, oil-based, weighted, and unweighted drilling fluids, and the technique may be utilized at any temperature or pressure. Embodiments disclosed herein require no additives or special chemical treatments, as required by many of the common techniques used to break filter cakes. The methods disclosed herein may provide economic, health, safety, and environmental benefits as compared to existing filter cake clean-up methods.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed:

1. A process for forming and subsequently breaking a filter cake, comprising:
    dissolving a non-reactive gas into solution with a wellbore fluid to form an energized fluid;
    pumping the energized fluid into a formation at a downhole pressure, wherein the pumping is at overbalanced conditions, producing a filter cake containing the energized fluid having the non-reactive gas dissolved therein; and
    decreasing the down hole pressure to below a solubility limit of the dissolved gas in the energized fluid to cause the dissolved gas to come out of solution in the form of a vapor phase, wherein the vapor phase compromises the integrity of the filter cake.

2. The process of claim 1, comprising forming the non-reactive gas in situ in the wellbore.

3. The process of claim 1, wherein the energized fluid is saturated with the non-reactive gas at a downhole pressure and temperature.

4. The process of claim 1, wherein the energized fluid is at least about 75% saturated with the non-reactive gas at a downhole pressure and temperature.

5. The process of claim 1, comprising:
    cementing the wellbore; and
    bringing the well on production.

6. The process of claim 1, wherein the non-reactive gas is selected from the group consisting of nitrogen, carbon dioxide, sulfur hexafluoride, helium, argon, neon, krypton, xenon, radon, carbon monoxide, air, oxygen, halogenated hydrocarbons, hydrogen, $C_1$ to $C_6$ hydrocarbons, nitrogen oxides, and combinations thereof.

7. The process of claim 1, wherein dissolving the non-reactive gas in the wellbore fluid comprises contacting the non-reactive gas and the wellbore fluid downhole.

8. The process of claim 1, wherein the non-reactive gas is dissolved or partially dissolved prior to pumping the wellbore fluid downhole.

9. The process of claim 1, wherein the wellbore fluid is substantially free of undissolved gas when at the downhole pressure and a downhole temperature.

10. The process of claim 1, wherein the vapor phase formed comprises from 0.001 to 1.0 liter of vapor per liter of wellbore fluid when at the downhole pressure and a downhole temperature.

11. The process of claim 1, wherein the vapor phase formed comprises 0.005 liters of vapor per liter of wellbore fluid or greater when at the downhole pressure and a downhole temperature.

12. The process of claim 1, wherein decreasing wellbore pressure comprises decreasing a density of the wellbore fluid in at least a portion of the wellbore.

13. The process of claim 1, wherein decreasing wellbore pressure comprises decreasing a wellbore circulating pump pressure.

14. The process of claim 1, wherein the wellbore fluid is selected from the group consisting of drilling fluids, workover fluids, finishing fluids, and combinations thereof.

15. The process of claim 1, comprising treating the filter cake with acid, enzymes, chelating agents, glycols, or combinations thereof.

16. The process of claim 15, wherein the filter cake comprises carbonate particles, enzymes, encapsulated acids, invertible emulsions, or combinations thereof.

17. A method of drilling a well, comprising:
circulating a wellbore fluid through the well, wherein the circulating comprises:
introducing the wellbore fluid into the well and into contact with a formation; and
withdrawing a portion of the wellbore fluid from the well;
dissolving a non-reactive gas into solution with the wellbore fluid to form an energized fluid by contacting the non-reactive gas and the wellbore fluid downhole at a downhole pressure and temperature;
subjecting the well to overbalanced conditions to form a filter cake containing the energized fluid having the non-reactive gas dissolved therein; and
decreasing the downhole pressure to below a solubility limit of the dissolved gas in the wellbore fluid to cause the dissolved gas to come out of solution in the form of a vapor phase;
wherein the decreasing the downhole pressure comprises decreasing a density of the wellbore fluid in at least a portion of the wellbore; and
wherein the vapor phase compromises the integrity of the filter cake.

18. The method of claim 17, wherein the non-reactive gas is selected from the group consisting of nitrogen, carbon dioxide, sulfur hexafluoride, helium, argon, halogenated hydrocarbons, krypton, xenon, radon, carbon monoxide, air, oxygen, freon, hydrogen, $C_1$ to $C_6$ hydrocarbons, nitrogen oxides, and combinations thereof.

19. The method of claim 17, wherein the vapor phase formed comprises from 0.001 to 1.0 liter of vapor per liter of residual fluid when at the downhole pressure and a downhole temperature.

20. The method of claim 17, wherein the vapor phase formed comprises 0.005 liters of vapor per liter of residual fluid or greater when at the downhole pressure and a downhole temperature.

21. A method of servicing a well, comprising:
circulating a wellbore fluid through the well, wherein the circulating comprises:
introducing the wellbore fluid into the well and into contact with a formation; and
withdrawing a portion of the wellbore fluid from the well;
dissolving a non-reactive gas into solution with the wellbore fluid to form an energized fluid by contacting the non-reactive gas and the wellbore fluid downhole at a downhole pressure and temperature;
subjecting the well to overbalanced conditions to form a filter cake containing the energized fluid having the non-reactive gas dissolved therein; and
servicing the well; and
decreasing the downhole pressure to below a solubility limit of the dissolved gas in the wellbore fluid to cause the dissolved gas to come out of solution in the form of a vapor phase;
wherein the decreasing the downhole pressure comprises decreasing a density of the wellbore fluid in at least a portion of the wellbore; and
wherein the vapor phase compromises the integrity of the filter cake.

22. The method of claim 21, wherein the non-reactive gas is selected from the group consisting of nitrogen, carbon dioxide, sulfur hexafluoride, helium, argon, neon, krypton, xenon, radon, carbon monoxide, air, oxygen, halogenated hydrocarbons, hydrogen, $C_1$ to $C_6$ hydrocarbons, nitrogen oxides, and combinations thereof.

* * * * *